UNITED STATES PATENT OFFICE.

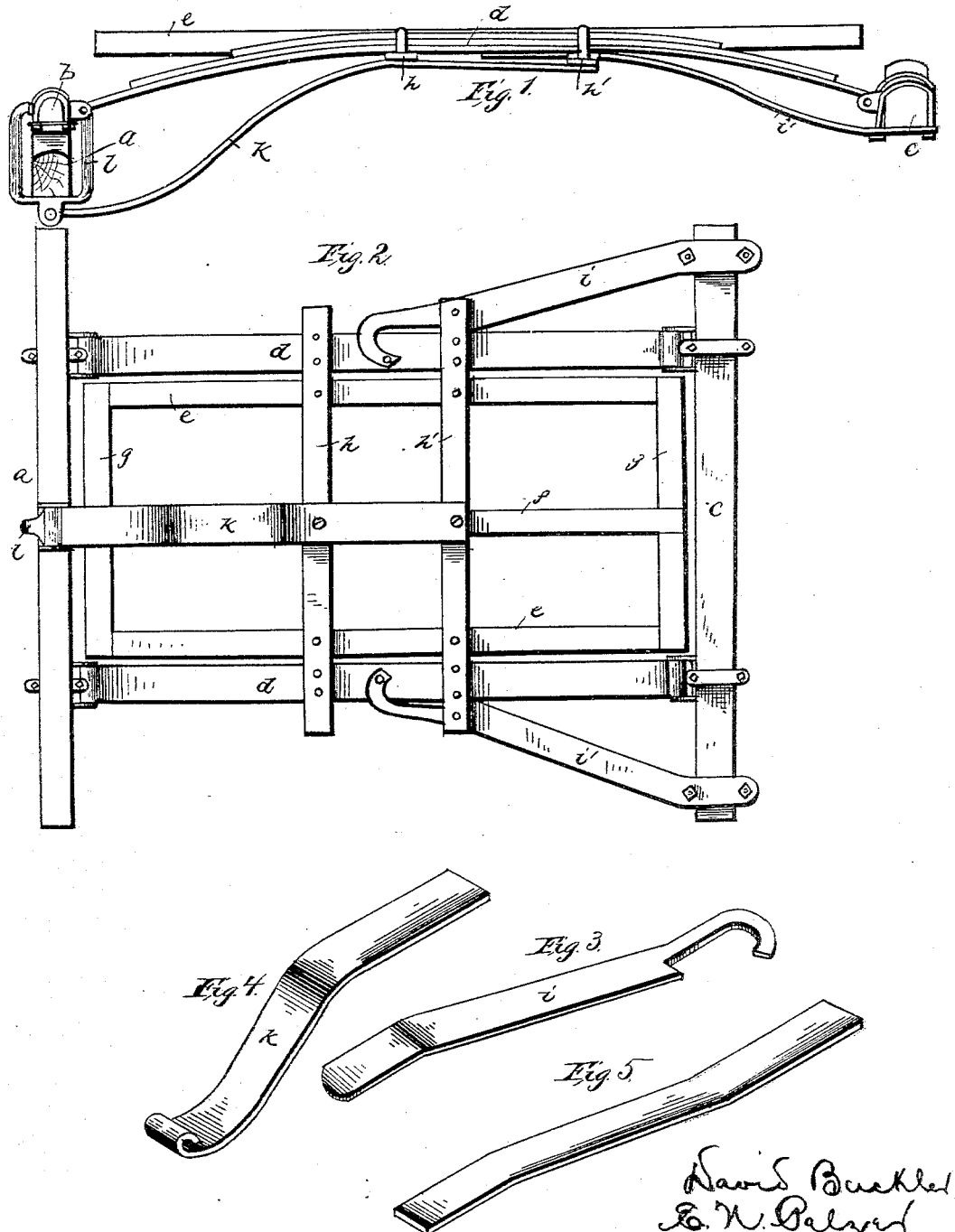

DAVID BUCKLER AND EDWARD NICHOLAS PELZER, OF IONIA, MICHIGAN, ASSIGNORS OF ONE-HALF TO ROBERT D. CAIN AND JULIUS TAUBERT, OF SAME PLACE.

SIDE-SPRING VEHICLE.

SPECIFICATION forming part of Letters Patent No. 303,981, dated August 26, 1884.

Application filed March 3, 1884. (No model.)

*To all whom it may concern:*

Be it known that we, DAVID BUCKLER, a subject of the Queen of Great Britain, and EDWARD N. PELZER, a citizen of the United States, both residing at Ionia, in the county of Ionia and State of Michigan, have invented a new and useful Spring-Vehicle, of which the following is a specification, reference being had to the accompanying drawings.

This invention has relation to spring-gear for vehicles; and it consists in the construction and novel arrangement of parts, as will be hereinafter fully described, and particularly pointed out in the claim appended.

Figure 1 is a side elevation of a portion of a side-spring vehicle to which our improved spring-gear is applied. Fig. 2 is a bottom view of the same. Fig. 3 is a detail view of one of the auxiliary side springs detached from the vehicle, and Fig. 4 is a detail view of the auxiliary middle spring. Fig. 5 is a modification.

Referring by letter to the accompanying drawings, $a$ designates the front axle; $b$, the head-block, and $c$ the rear axle, constructed in any of the well-known forms. The side springs $d\,d$ are arched upwardly, as shown, and are clipped to the axle and head-block by shackles in the customary manner. The side sills and middle sill of the bottom of the body are respectively designated $e\,e$ and $f$, and the end sills by $g\,g$. The sills $e\,e$ and $f$ are provided with metal cross-strips $h\,h'$, extending entirely across the body and projecting at the sides thereof, as shown; or short separate bars may be secured to the bottom of the body and project at the sides; or they may be made in angular form and be secured to the sides of the body and project in a similar manner; but the transverse strips $h\,h'$ are preferable. These transverse metal bars or strips $h\,h'$ are parallel and are some little distance apart, as shown, and the side springs $d\,d$ are clipped or bolted to their upper faces on their projecting ends. Two flat auxiliary side springs, $i\,i'$, are clipped at their rear ends, which are straight for a small portion of their length, to the rear axle outside of the clips which secure the side springs $d\,d$ to said axle. These auxiliary side springs $i\,i'$ extend forward and upward from their connections with the rear axle on convergent lines, and are of the same width until they reach the rear metal cross-bar, $h'$, to the projecting ends of which they are clipped or bolted beneath the side springs $d\,d$ by the same clips or bolts that secure the side springs in place. From this connecting-point forward they are reduced in width, extend nearly straight forward, and terminate in lateral inwardly-turned hooks $i^2$, which are bolted or riveted to the under faces of the side springs $d\,d$ between the metal cross-bars $h\,h'$, as shown. These auxiliary side springs $i\,i'$ are reduced in size at their forward ends to give greater elasticity at these points. The third auxiliary spring, $k$, employed in this construction is a middle spring nearly straight for a portion of its length, which straight portion is clipped or bolted to the under faces of the middle portions of the transverse bars $h\,h'$, or where they are not employed to the under face of the middle body-sill, and is then curved downward and forward to the front axle, $a$, to the under face of which, at its middle portion, it is connected by a shackle, $l$, or in any other suitable manner.

By this construction we produce a light, durable, cheap, and efficient spring-gear for vehicles, one in which side motion is prevented, and in which the weight on the body is evenly distributed throughout.

Having thus fully described our invention, what we claim as new, and desire to secure by Letters Patent of the United States, is—

In a vehicle, the combination, with the side springs $d\,d$, secured to the rear axle and to the head-block, and the body having side bearings intermediate of its ends, of the auxiliary side springs $i\,i'$, secured to the rear axle outside of the main springs $d\,d$, and connected to the bearings on the body and provided with reduced hook ends secured to the under faces of the side springs $d\,d$, and the middle auxiliary spring, $k$, secured to the body and to the front axle, substantially as specified.

In testimony that we claim the foregoing as our own we have hereto affixed our signatures in presence of two witnesses.

DAVID BUCKLER.
EDWARD NICHOLAS PELZER.

Witnesses:
HENRY P. TAYLOR,
C. A. PRESTON.